United States Patent
Paddock et al.

(10) Patent No.: US 7,322,249 B2
(45) Date of Patent: Jan. 29, 2008

(54) MOUNTING FOR A PROBE SENSOR

(75) Inventors: Stephen G Paddock, El Paso, TX (US); Leonel A. Barrera, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 11/176,430

(22) Filed: Jul. 7, 2005

(65) Prior Publication Data

US 2007/0006661 A1     Jan. 11, 2007

(51) Int. Cl.
*F16B 31/02* (2006.01)

(52) U.S. Cl. .................. 73/761; 73/493; 73/866.5; 248/610; 248/612; 248/613; 248/904

(58) Field of Classification Search .............. 73/493, 73/761, 866.5; 248/610, 612, 613, 904
See application file for complete search history.

(56) References Cited

U.S. PATENT DOCUMENTS

| | | | | |
|---|---|---|---|---|
| 4,779,434 A | * | 10/1988 | Derman | 70/230 |
| 4,788,870 A | * | 12/1988 | Gath et al. | 73/866.5 |
| 5,295,405 A | * | 3/1994 | Gumbert et al. | 74/99 R |
| 5,705,930 A | * | 1/1998 | Forfitt | 324/453 |
| 5,922,953 A | | 7/1999 | Payne et al. | 73/494 |
| 5,951,191 A | | 9/1999 | Schroeder et al. | 403/13 |
| 5,996,408 A | * | 12/1999 | TenBrink et al. | 73/493 |
| 6,062,529 A | | 5/2000 | Stevenson et al. | 248/674 |
| 6,070,865 A | | 6/2000 | Schroeder et al. | 269/47 |
| 6,123,301 A | | 9/2000 | Schroeder et al. | 248/200 |
| 6,176,636 B1 | | 1/2001 | Stevenson et al. | 403/13 |
| 6,272,747 B1 | | 8/2001 | Schroeder et al. | 29/888.01 |
| 6,453,732 B2 | | 9/2002 | Schroeder et al. | 73/116 |
| 6,539,800 B2 | * | 4/2003 | Yamashita | 73/493 |
| 6,579,030 B2 | | 6/2003 | Uhler et al. | 403/348 |
| 6,736,355 B2 | | 5/2004 | Palfenier et al. | 248/70 |
| 6,774,623 B2 | | 8/2004 | Palfenier et al. | 324/207.15 |
| 6,788,054 B2 | | 9/2004 | Collins et al. | 324/262 |
| 6,851,306 B2 | | 2/2005 | Shost et al. | 73/119 R |
| 2002/0007675 A1 | * | 1/2002 | Yamashita | 73/493 |
| 2003/0230689 A1 | | 12/2003 | Palfenier et al. | 248/309.1 |
| 2004/0069914 A1 | | 4/2004 | Palfenier et al. | 248/200 |

* cited by examiner

*Primary Examiner*—Edward Lefkowitz
*Assistant Examiner*—Freddie Kirkland, III
(74) *Attorney, Agent, or Firm*—Paul L. Marshall

(57) ABSTRACT

A robust, easy to mount probe sensor includes an elongated body enclosing a sensor element and an integral flange extending away from the body. The body and flange are formed of material having a relatively low characteristic yield point. First and second generally parallel closely spaced through passages extend through the flange. An insert formed of material having a relatively high characteristic yield point is disposed in one of the passages. A fastener including a shank portion which extends through the other passageway includes an enlarged head which overlays the insert containing passageway and engages an attachment structure to effect directed compressive loading of the probe sensor flange.

24 Claims, 2 Drawing Sheets

MOUNTING FOR A PROBE SENSOR

TECHNICAL FIELD

The present invention relates generally to the packaging and mounting of transducers within a host system such as a motor vehicle. More particularly, the present invention relates to the cantilevered mounting of probe type electronic sensors.

BACKGROUND OF THE INVENTION

Electronic sensors which are suitable for detecting discontinuities, such as gear teeth, along a target surface are well known and used in automotive applications such as brake systems, cruise control systems, transmission systems, as well as many others. In its environment of use, the sensor apparatus requires a support structure, a sensor housing and means for mounting the sensor housing onto the support structure. The stack-up of tolerances of the components comprising the sensor within the housing in addition to the stack-up of tolerances associated with connection to the mounting bracket for mounting the sensor housing onto the support structure contribute to the difficulty of establishing the precise length of the air gap between the sensor and the target surface. In addition, the location of the sensor and target surface may be hidden and therefore it may be difficult, expensive and impractical to precisely measure. Consequently, there is a need to minimize the stack-up of tolerances.

The majority of magnetic sensors used in automotive applications involve non-adjustable air gap placement, wherein the stack-up of tolerances results in an internal air gap that causes deviation from the optimal external air gap. For example, a rigid bracket is affixed to the body of a magnetic sensor. The magnetic sensor is placed into a sensor bore in the engine block, and the bracket is bolted, via a bolt hole in the bracket, to a threaded mounting hole in a mounting surface of the engine block. When the bracket is bolted, the length of the sensor body from the bolt hole of the bracket to the sensor tip determines the external air gap with respect to the target, which air gap is affected by the stack-up of tolerances. Even though subject to tolerance related placement inaccuracy, this structural mounting methodology is used widely because of the simplicity of the hardware, and ease of assembly and service.

In situations where external air gap variation cannot be tolerated, the external air gap is preset during magnetic sensor installation by means of an adjustable bracket, often referred to as a "side-mount" bracket. The adjustability of side mount brackets resides in a bolt slot, which allows for the bracket to be adjusted along the slot elongation relative to the threaded mounting hole of the mounting surface.

The challenge of maintaining tight air gap tolerances is exacerbated by increased temperatures and alternative materials typically found in automotive environments. Differences in coefficients of thermal expansion and other disparate material properties of elements of a sensor mounting assembly can adversely impact system performance. For example, certain materials can exhibit plastic behavior when subjected to tight clamping forces at high temperatures. Thus, the integrity of the mounting of a sensor can be lost under harsh conditions, resulting in looseness, misalignment and even catastrophic failure.

Certain solutions have been proposed, including the use of composite materials and/or reinforcing high strength inserts within base materials having low yield strength. For example, annular metal bushings are often inserted within through passages for fasteners and affixed to the base material through bonding or the use of knurls on the outer peripheral surface of the insert. When torque is applied, the fastener extending through the bushing effects compressive loading to the bushing, rather than the surrounding base material and, if properly designed, avoids exceeding the yield point of the base material. A significant disadvantage of this approach is in the tendency of the annular bushing to lose adhesion or affixation with the surrounding base material and rotate with the fastener. This results in a loose sensor mounting.

What remains needed in the art, is a robust sensor mounting design which tolerates the use of non-traditional, low cost materials while maintaining precision of alignment and system integrity under a full range of harsh operating conditions.

BRIEF DESCRIPTION OF THE INVENTION

Generally, the present invention fulfills the forgoing needs by providing, in one aspect thereof, the combination of an electromechanical device, such as a probe sensor, with a fastener. The electromechanical device includes a body portion and a flange extending there from, wherein the flange defines opposed, generally parallel surfaces. First and second passages are formed within the flange, with each passage interconnecting the parallel surfaces. An insert member is disposed within the first passageway. Lastly, the fastener has a head portion which substantially overlays the first passageway and a shank portion which extends through the second passageway. In application, the shank portion serves to interconnect the head portion with a substantially fixed structure, such as the frame of a motor vehicle, and thereby affect substantial compressive loading on the insert member. This arrangement has the advantage of reducing overall cost and weight of the device while providing a more robust design.

According to an aspect of the invention, the insert member is formed of a material having a relatively high yield point, such as steel, while the body portion and flange are formed of base material having a relatively low yield point, such as polymeric material. This arrangement permits substantial weight and cost reduction of the sensor without degradation of overall performance and reliability.

According to another aspect of the invention, the first and second passageways extend normally to the parallel flange surfaces and are tangentially aligned. This arrangement has the advantage of facilitating mold forming of the body portion and flange using low cost tooling and processes.

According to another aspect of the invention, the insert member is substantially cylindrical in shape and has one or more localized crimps formed therein to affect a regionalized increase in the nominal cross-sectional dimension in at least one direction generally parallel to the flange parallel surfaces. This feature has the advantage of using inexpensive bar stock to fabricate the insert members and ensures that the insert member remains in place after being press or interference fit within the first passageway.

According to yet another aspect of the invention, the insert member can be circumferentially elongated to provide greater composite yield strength without increasing the total amount of material employed in the insert member.

According to still another aspect of the invention, the first and second passageways are aligned on a line of elongation of the flange, which extends through the body portion of the electromechanical device. This arrangement has the advantage of minimizing the overall dimensions of the flange, which saves piece cost and enhances packaging flexibility of the overall system.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

DETAILED DESCRIPTION OF THE PREFERRED AND ALTERNATIVE EMBODIMENTS OF THE INVENTION

The present invention is intended for application in automotive vehicle systems and will be described in that context. It is to be understood, however, that the present invention could also be successfully applied in many other applications. Accordingly, the claims herein should not be deemed as limited to the specifics of the preferred application as described hereunder. The preferred application of the present invention involves the mounting of a probe type sensor as part of an automotive system and represents an extremely robust, low cost, compact design, which can be easily configured to accommodate application specific packaging requirements. Furthermore, the component configuration and arrangement enables use of simplified manufacturing processes and somewhat relaxed tolerances, increasing turnover and lowering cost without adversely impacting quality.

Figure 1:
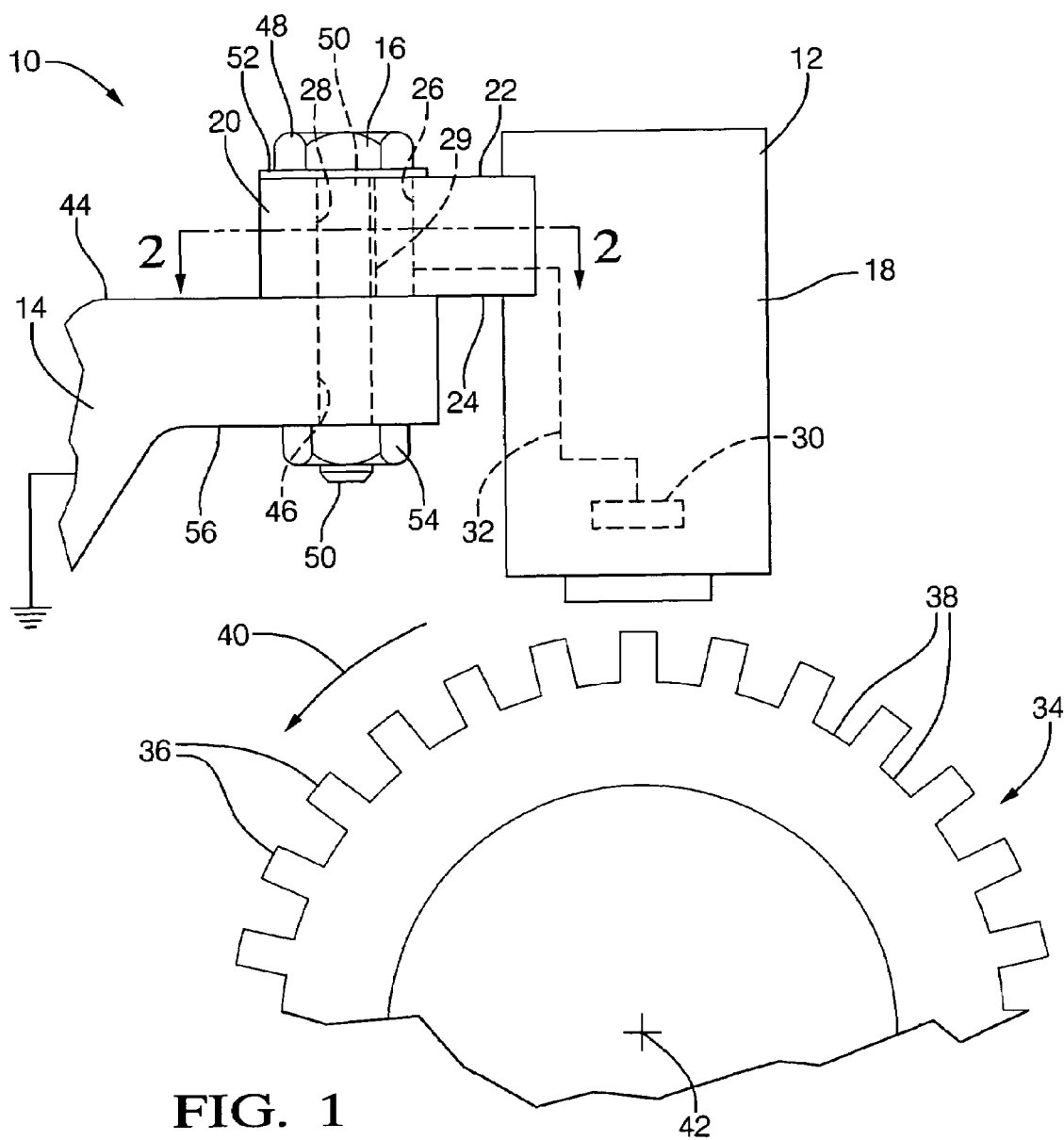
FIG. 1, is a broken plan view of a sensor mounting system of one embodiment of the present invention.

Referring to FIG. 1, a probe sensor assembly 10 is illustrated comprising a probe sensor 12 rigidly mounted to a relatively fixed attachment structure such as an automobile frame 14 by a fastener 16. Probe sensor 12 consists of an elongated body portion 18 and a flange 20 extending from one end thereof. The body portion 18 and flange 20 are preferably integrally formed from plastic material by injection molding or similar process.

As illustrated in FIG. 1, flange 20 defines generally parallel upper and lower surfaces 22 and 24, respectively. First and second adjacent parallel passageways 26 and 28, respectively, interconnect surfaces 22 and 24. Optimally, passageways 26 and 28 are tangentially adjacent, wherein they define a single line of contact. However, because of dimensional tolerance stack-up inherent to any manufacturing process, the passageways 26 and 28 are separated sufficiently to ensure that they can never inadvertently overlap. As a result, a this intermediate web 29 is disposed there between.

Figure 2:
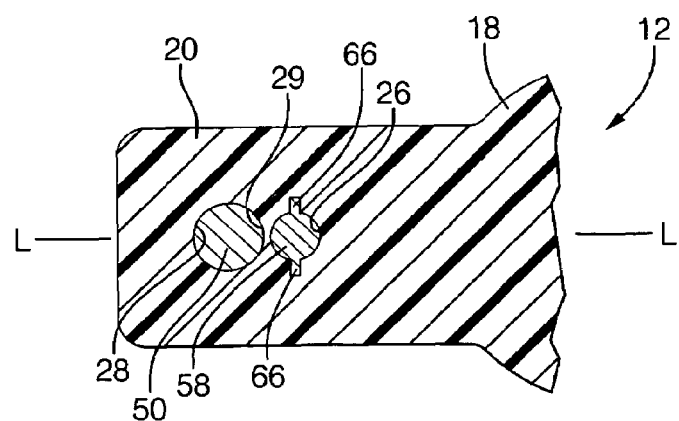
FIG. 2, is a broken cross-sectional view of the sensor mounting system taken on line 2-2 of FIG. 1.

Referring to FIG. 2, first and second passageways 26 and 28, respectively, are aligned along a line of elongation (designated L-L) extending along the major dimension of flange 20. With this feature, the nominal width of flange 20 can be minimized, enhancing the ease of packaging the probe sensor 12 within a host system.

A galvanomagnetic sensing element 30, such as a magnetoresistive or Hall effect sensor is disposed within the cantilevered end of body portion 18 opposite the flange 20. Electrical interconnections (not illustrated) extend from sensing element 30 to an electrical controller and power supply source located in the host vehicle as is well known in the art. An electrical lead-out 32 is insulatively molded within sensor 12, interconnecting sensing element 30 with the first passageway 26.

In the preferred application of the present invention, a rotating target member or gear 34 having alternating ferrous teeth 36 and voids 38 is radially spaced from the probe sensor 12 by a fixed air-gap and is mounted for rotation, as indicated by arrow 40 about an axis 42. The mechanism which effects mounting of target gear 34 (not illustrated) is rigidly affixed to attachment structure 14 to ensure that there is no variation between upper surface 22 of mounting structure 14 and axis 42 when in use.

As illustrated in FIG. 1, attachment structure defines a mounting surface 44 upon which the lower surface 24 of flange 20 is mountingly disposed. A passageway 46 in attachment structure 14 coaxially registers with second passageway 28 in flange 20.

Fastener 16 preferably comprises a bolt configuration including a head 48 and shank 50 extending entirely through second passageway 28 in flange 20 and passageway 46 in attachment structure 14. Shank 50 is formed to establish a precise slip-fit through passageways 28 and 46 and thereby minimize any lateral or radial looseness. Fastener head 48 is of sufficient diameter to substantially overlay first passageway 26. A washer 52 is disposed intermediate head 48 and upper surface 22 of flange 20. The lowermost portion of shank 50 threadably engages a nut 54. The upper surface of nut 54 abuts a lower surface 56 formed on attachment structure 14, which is substantially parallel to mounting surface 44. When nut 54 is advanced along shank 50, it co-acts with head 48 to effectively clamp the probe sensor 12 rigidly in its illustrated position with respect to attachment structure 14. This ensures a robust attachment configuration, which precisely maintains the dimension of the air-gap between the sensing element 30 and target gear 34.

Figure 3:
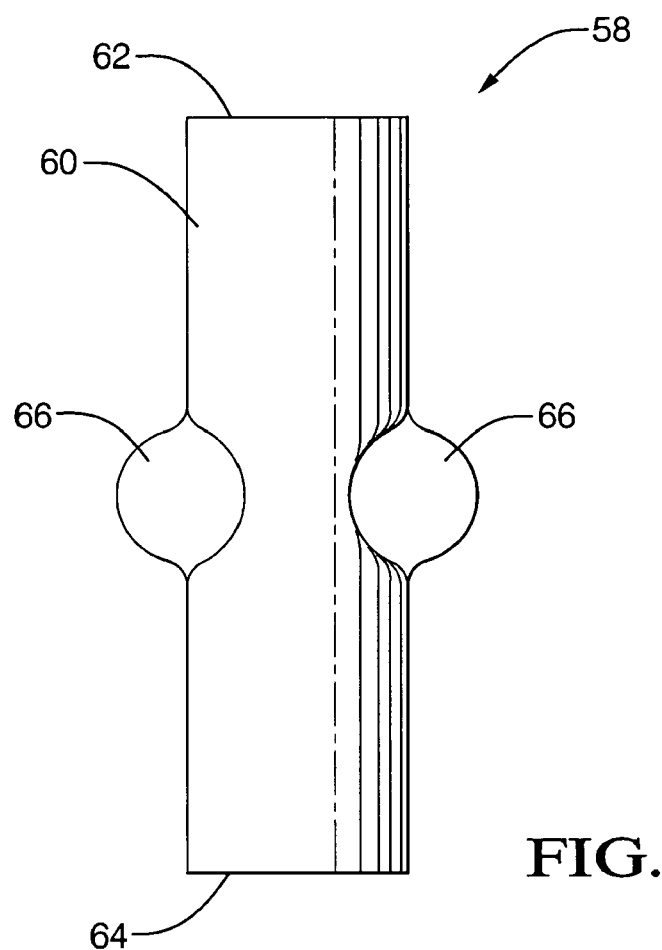
FIG. 3, is a side plan view of the insert member illustrated in FIG. 2.

Referring to FIGS. 1-3, an insert 58, formed of steel or other inexpensive material characterized by a relatively high yield point when subjected to compressive loading, is formed in a generally cylindrical shape defining an outer peripheral surface 60 and opposed top and bottom surfaces 62 and 64, respectively. Central areas 66 of insert 58 are pinched to locally create an increase in effective diameter of insert 58. Any number of alternative shapes and configurations can be employed to ensure secure retention of retainer 58 within first passageway 26. This is but an example.

Insert 58 is press fit within first passageway 26 with its upper surface disposed in a co-planer relationship with upper surface 22 of flange 20 and its lower surface 64 disposed in a co-planer relationship with lower surface 24 of flange 20. Central pinch areas 66 of insert 58 are dimensioned to form an interference fit within first passageway 26 to ensure it remains in place as illustrated. This design has proven to be extremely inexpensive to manufacture while being extremely robust. As an alternative, insert 58 can be insert molded within the flange 20 of probe sensor 12.

When assembled as illustrated in FIG. 1, head 48 and optional washer 52 of fastener 16 preferably entirely overlay the top surface 62 of insert 58. Thus, the underside of head 48 is in abutting relationship with the upper surface of washer 52 and the underside of washer 52 is optimally simultaneously in an abutting relationship with both the top surface 62 of insert 58 as well as the adjoining upper surface 22 of flange 20 circumscribing the first and second passageways 26 and 28, respectively, where they emerge through upper surface 22.

Similarly, the mounting surface 44 of attachment structure 14 is in abutting relationship with the bottom surface 64 of insert 58 as well as the adjoining lower surface 24 of flange 20 circumscribing the first and second passageways 26 and 28, respectively, where they emerge through lower surface 24.

Upon assembly, nut 54 is threadably advanced along shank 50 until a design specific torque level is reached. At that point, the upper surface of nut 54 bears upwardly against the lower surface 56 of attachment structure 14 while the lower surface of head 48 of fastener 16 bears downwardly against (through intermediate washer 52) the upper surface 22 of the flange 20 of probe sensor 12. This clamping assembly effects substantially compressive loading of flange 20 by the head 48 and nut 54.

With the application of high compressive clamping forces through the flange 20, the material forming flange 20 would either immediately yield and deform or slowly deform through creep. In either event, the effective spacing between upper and lower surfaces 22 and 24, respectively, would be (at least locally) reduced, resulting in loosening of the probe sensor 12 mount upon the attachment structure 14. Inclusion of the insert 58 maintains the integrity of spacing between the upper and lower surfaces 22 and 24, respectively, of the flange 20 by shunting the majority of the compressive loading through the insert 58. This results in minimized compressive loading of the low-yield characteristic material forming the flange 20 and the maintenance of the dimensional integrity of the flange 20. As a result, the affixation of the probe sensor 12 to the attachment structure 14 will remain secure, even with high compressive loading imposed by the fastener 16.

Figure 4:
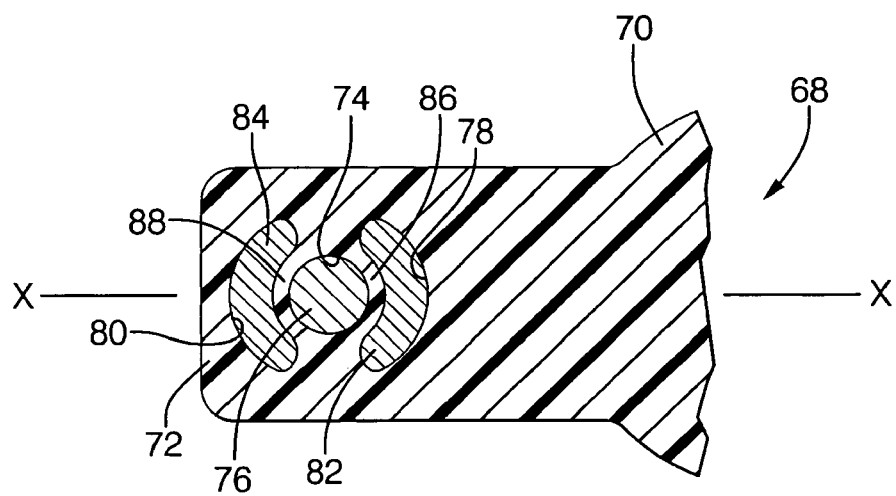
FIG. 4, is a broken cross-sectional view, similar to that of FIG. 2, of an alternative embodiment of the invention.

Referring to FIG. 4, an alternative design for mounting a probe sensor 68 is illustrated. Probe sensor 68 comprises a body portion 70 with a mounting flange 72 extending leftwardly there from along a line of elongation X-X. The embodiment of the invention depicted in FIG. 4 is substantially identical to that described herein above with respect to FIGS. 1-3, with the exceptions as set forth herein below.

A first passageway 74 extends through flange 72 for receiving a fastener shank 76, which engages an attachment structure such as described in connection with FIG. 1. A second, generally crescent shaped passageway 78, spaced rightwardly from first passageway 74 along line of elongation X-X also extends through flange 72. Similarly, a third passageway 80, spaced leftwardly from first passageway 74 along line of elongation X-X also extends through flange 72. Passageways 78 and 80 are generally crescent shaped mirror images of one another and receive press fit inserts 82 and 84, respectively therein. Inserts 82 and 84 are formed of material with a characteristic high yield point similar to insert 58 described herein above.

Second passageway 78 is interspaced from first passageway 74 by a web 86. Likewise, third passageway 80 is interspaced from first passageway 74 by a similarly shaped web 88. Inserts 82 and 84 extend substantially through flange 72 and, in application, absorb most of the compressive loading imposed by the fastener associated with shank 76 to prevent plastic-like yield, deformation or creep of the material forming flange 72.

The principle advantage of the embodiment of the invention of FIG. 4 is the relatively larger inserts 82 and 84 more evenly balance applied compressive forces circumferentially about shank 76 and can absorb substantially higher clamping forces.

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basic constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. For example, the top surface 62 of insert 58 can be positioned above or below upper surface 22 of flange 20 and bottom surface 64 of insert 58 can be positioned above or below lower surface 24 of flange 20 without departing from the broad spirit of the present invention. Any analogous configuration wherein a significant portion of the compressive loading forces applied by fastener 16 are directed through the insert 58 to avoid substantial deformation of the flange 20 by exceeding the yield point of the material forming the flange 20 is covered hereby. It is, therefore, to be understood that within the scope of the appended claims, wherein reference numerals are merely for illustrative purposes and convenience and are not to be in any way limiting, the invention, which is defined by the following claims as interpreted according to the principles of patent law, including the Doctrine of Equivalents, may be practiced otherwise that as specifically described.

The invention claimed is:

1. In combination:
   an electromechanical device, such as a probe sensor, including a body portion and a flange extending there from, said flange defining opposed, generally parallel surfaces;
   first and second passageways within said flange, each said passageway interconnecting said parallel surfaces;
   a metal insert member disposed within said first passageway; and
   a fastener including a head portion substantially overlaying said first passageway and a shank portion extending through said second passageway and operative, in application, to interconnect said head portion with a substantially fixed attachment structure, and thereby to effect substantial compressive loading on said insert member.

2. The combination of claim 1, wherein said body portion and flange are integrally formed.

3. The combination of claim 1, wherein said flange is formed of polymeric material.

4. The combination of claim 1, wherein said first and second passageways comprise first and second through passages, each of which extend generally normally to the surfaces of said flange.

5. The combination of claim 4, wherein said first and second through passages extend substantially parallel to one another.

6. The combination of claim 4, wherein said first and second through passages are substantially tangentially adjacent to one another.

7. The combination of claim 1, wherein said first and second passageways are substantially circular in cross-section.

8. The combination of claim 1, wherein said first passageway has a characteristic circumferentially elongated cross-section.

9. The combination of claim 1, wherein said first and second passageways have generally similar characteristic cross-sectional areas.

10. The combination of claim 1, wherein said insert member extends entirely through said first passageway.

11. The combination of claim 1, wherein said insert member has a characteristic cross-sectional area similar in shape and size to said first passageway.

12. The combination of claim 11, wherein said insert member is press fit within said first passageway.

13. The combination of claim 1, wherein, in application, said insert member is subjected to substantially compressive loading directed normally to said flange parallel surfaces.

14. The combination of claim 1, wherein said insert member is circumferentially elongated.

15. A probe sensor assembly comprising:
an elongated body enclosing a sensor element adjacent one end thereof;
a flange integrally formed with said body adjacent an opposed end thereof and extending outwardly there from, said body and flange formed from a material having a relatively low characteristic yield point, said flange defining generally parallel upper and lower surfaces;
first and second tangentially adjacent through passages interconnecting the upper and lower surfaces of said flange;
an insert member fixedly disposed within first through passage and extending substantially entirely there through, said insert member formed of a material having a relatively high characteristic yield point and defining an upper abutment surface disposed substantially coplanar with said upper flange surface and an opposed lower abutment surface disposed substantially coplanar with said lower flange surface; and
a fastener integrally formed of a material having a relatively high characteristic yield point including a head portion integrally formed with an elongated shank portion, said shank portion extending through said second through passage and operative, in application, to interconnect the head portion with a relatively fixed attachment structure, said head portion defining a lower surface which extends radially sufficiently to substantially overlay said first through passage and form an abutting relationship with the upper abutment surface of the insert member and thereby to effect substantially compressive loading on said insert member.

16. The probe sensor assembly of claim 15, wherein said flange is elongated in a direction normal to the line of elongation of said body, and said first and second through passages are aligned along said flange line of elongation.

17. The probe sensor assembly of claim 15, wherein said body and flange are constructed of electrically insulating material and said insert member is constructed of electrically conductive material, and further comprising an electrical lead-out interconnecting said sensing element and said insert member.

18. In combination:
an electromechanical device, such as a probe sensor, including a body portion and a flange extending there from, said flange defining opposed, generally parallel surfaces;
first and second passageways within said flange, each said passageway interconnecting said parallel surfaces;
an insert member disposed within said first passageway; and
a fastener including a head portion substantially overlaying said first passageway and a shank portion extending through said second passageway and operative, in application, to interconnect said head portion with a substantially fixed attachment structure, and thereby to effect substantial compressive loading on said insert member,
wherein said insert member is formed of material having a characteristic yield point, which is substantially higher than the characteristic yield point of the material forming said flange.

19. In combination:
an electromechanical device, such as a probe sensor, including a body portion and a flange extending there from, said flange defining opposed, generally parallel surfaces;
first and second passageways within said flange, each said passageway interconnecting said parallel surfaces;
an insert member disposed within said first passageway; and
a fastener including a head portion substantially overlaying said first passageway and a shank portion extending through said second passageway and operative, in application, to interconnect said head portion with a substantially fixed attachment structure, and thereby to effect substantial compressive loading on said insert member,
wherein said insert member defines a first abutment surface disposed in contact with the overlaying portion of said fastener means head portion.

20. The combination of claim 19, wherein said first abutment surface of said insert member is substantially coplanar with one of said flange parallel surfaces.

21. The combination of claim 19, wherein said insert member defines a second, opposed abutment surface which, in application, is disposed in contact with an adjacent surface of said attachment structure.

22. The combination of claim 21, wherein said second abutment surface of said insert member is substantially coplanar with the other of said flange parallel surfaces.

23. In combination:
an electromechanical device, such as a probe sensor, including a body portion and a flange extending there from, said flange defining opposed, generally parallel surfaces;
first and second passageways within said flange, each said passageway interconnecting said parallel surfaces;
an insert member disposed within said first passageway;
a fastener including a head portion substantially overlaying said first passageway and a shank portion extending through said second passageway and operative, in application, to interconnect said head portion with a substantially fixed attachment structure, and thereby to effect substantial compressive loading on said insert member; and
a localized deformation pre-formed within said insert member to effect a regionalized increase in a nominal cross-sectional dimension in at least one direction generally parallel to said flange parallel surfaces.

24. In combination:

an electromechanical device, such as a probe sensor, including a body portion and a flange extending there from, said flange defining opposed, generally parallel surfaces;

first and second passageways within said flange, each said passageway interconnecting said parallel surfaces;

an insert member disposed within said first passageway; and a fastener including a head portion substantially overlaying said first passageway and a shank portion extending through said second passageway and operative, in application, to interconnect said head portion with a substantially fixed attachment structure, and thereby to effect substantial compressive loading on said insert member, wherein said insert member is insert molded within said flange.

* * * * *